US008184604B2

(12) United States Patent
Shiba et al.

(10) Patent No.: US 8,184,604 B2
(45) Date of Patent: May 22, 2012

(54) WIRELESS COMMUNICATION APPARATUS CAPABLE OF PERFORMING AGGREGATED TRANSMISSION

(75) Inventors: Youichirou Shiba, Fuchu (JP); Kiyotaka Matsue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 463 days.

(21) Appl. No.: 12/463,739

(22) Filed: May 11, 2009

(65) Prior Publication Data

US 2009/0285192 A1 Nov. 19, 2009

(30) Foreign Application Priority Data

May 13, 2008 (JP) ................................. 2008-126078

(51) Int. Cl.
*H04W 80/00* (2009.01)
(52) U.S. Cl. ....................................................... 370/338
(58) Field of Classification Search .................. 370/310, 370/328, 329, 345, 349, 351, 389, 392, 464, 370/465, 473
See application file for complete search history.

(56) References Cited

U.S. PATENT DOCUMENTS

| | | | | |
|---|---|---|---|---|
| 7,489,688 B2 * | 2/2009 | Giesberts et al. | ............. | 370/392 |
| 7,626,968 B2 * | 12/2009 | Adachi et al. | ................. | 370/338 |
| 2005/0135295 A1 * | 6/2005 | Walton et al. | ................. | 370/328 |
| 2006/0013256 A1 * | 1/2006 | Lee et al. | ........................ | 370/473 |
| 2007/0058605 A1 * | 3/2007 | Meylan et al. | ................. | 370/346 |
| 2007/0165590 A1 * | 7/2007 | Kneckt et al. | ................. | 370/345 |
| 2007/0230493 A1 * | 10/2007 | Dravida et al. | ................ | 370/412 |
| 2008/0080437 A1 * | 4/2008 | Krishnaswamy et al. | ..... | 370/338 |
| 2008/0159205 A1 * | 7/2008 | Sekiya et al. | ................. | 370/328 |
| 2009/0141723 A1 * | 6/2009 | Giesberts et al. | ............. | 370/392 |
| 2009/0232124 A1 * | 9/2009 | Cordeiro et al. | ............. | 370/349 |

FOREIGN PATENT DOCUMENTS

JP 2000-341326 12/2000

OTHER PUBLICATIONS

"Information Technology—Telecommunications and information exchange between systems—Local and metropolitan area networks—Specific requirements—Part 11: Wireless LAN Medium Access Control (MAC) and Physical Layer (PHY) Specifications", ANSI/IEEE Std 802.11, 1999 Edition, 1999, 2 pages, http://grouper.ieee.org/groups/802/11.

* cited by examiner

*Primary Examiner* — Chi Pham
*Assistant Examiner* — Robert Lopata
(74) *Attorney, Agent, or Firm* — Oblon, Spivak, McClelland, Maier & Neustadt, L.L.P.

(57) ABSTRACT

When a communication is performed between an access point and a wireless terminal according to the IEEE 802.11 of a wireless LAN communication, a MAC layer block of a wireless communication apparatus used as the access point adds an identifier showing a support of aggregated transmission of a MAC layer management frame or upper layer several frames to a body of a beacon frame.

15 Claims, 11 Drawing Sheets

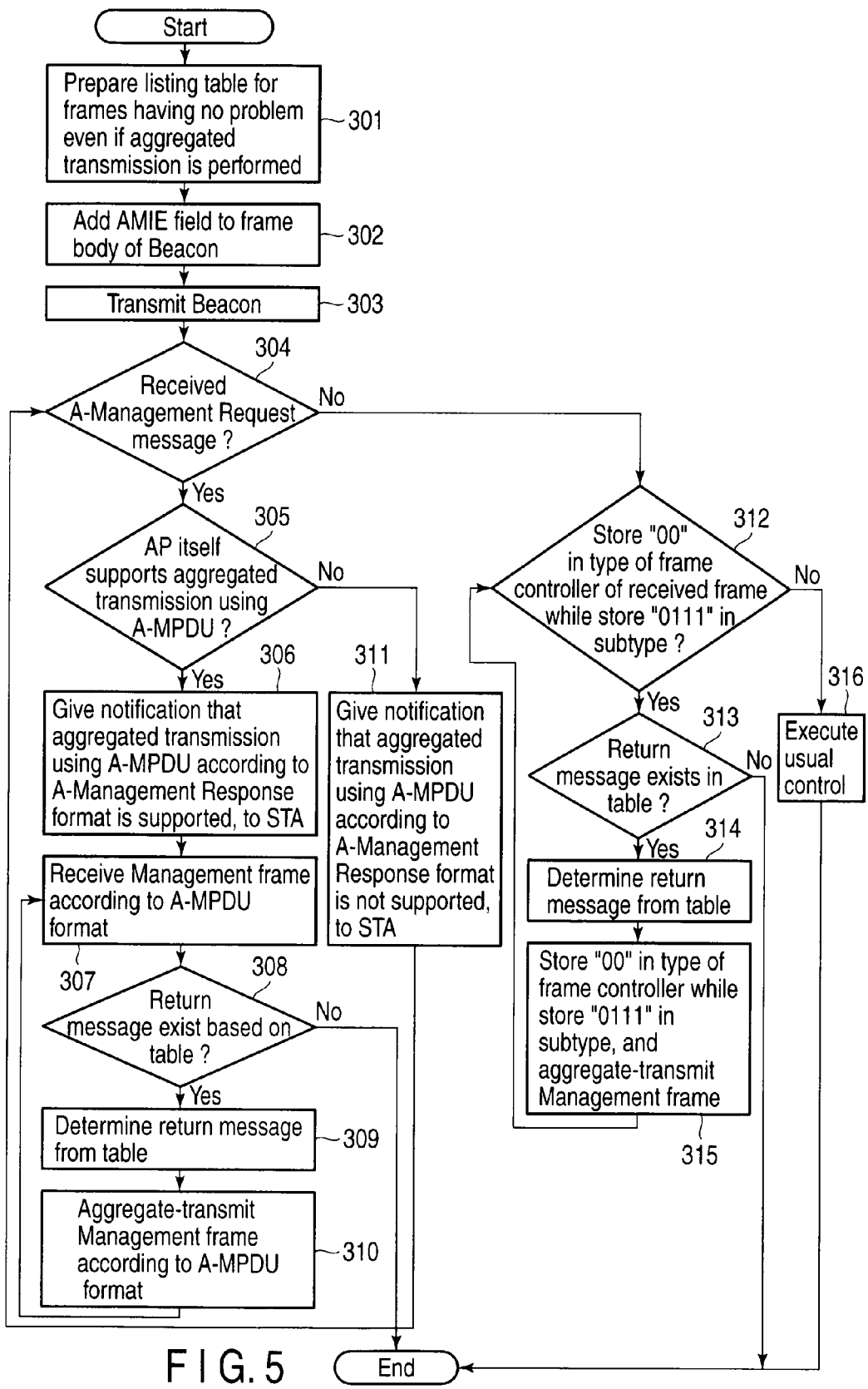
F I G. 5

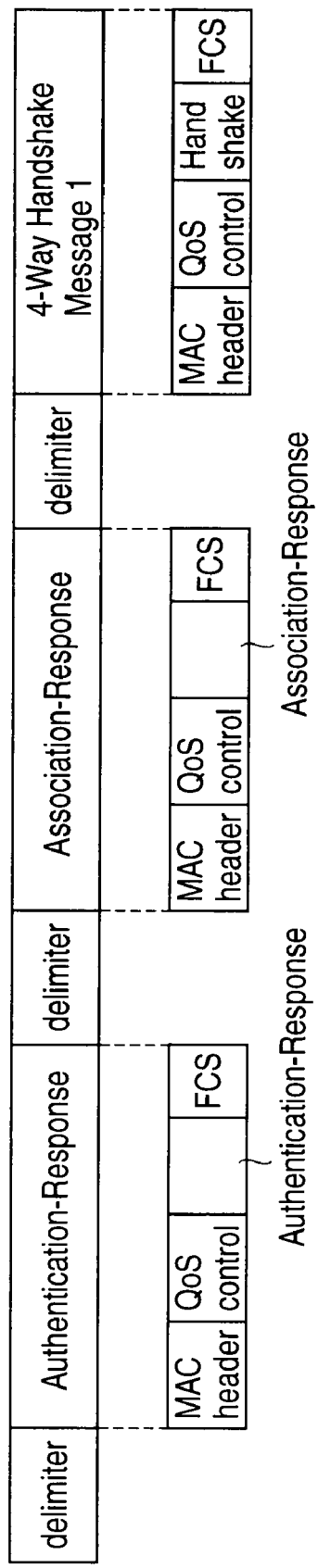
F I G. 9

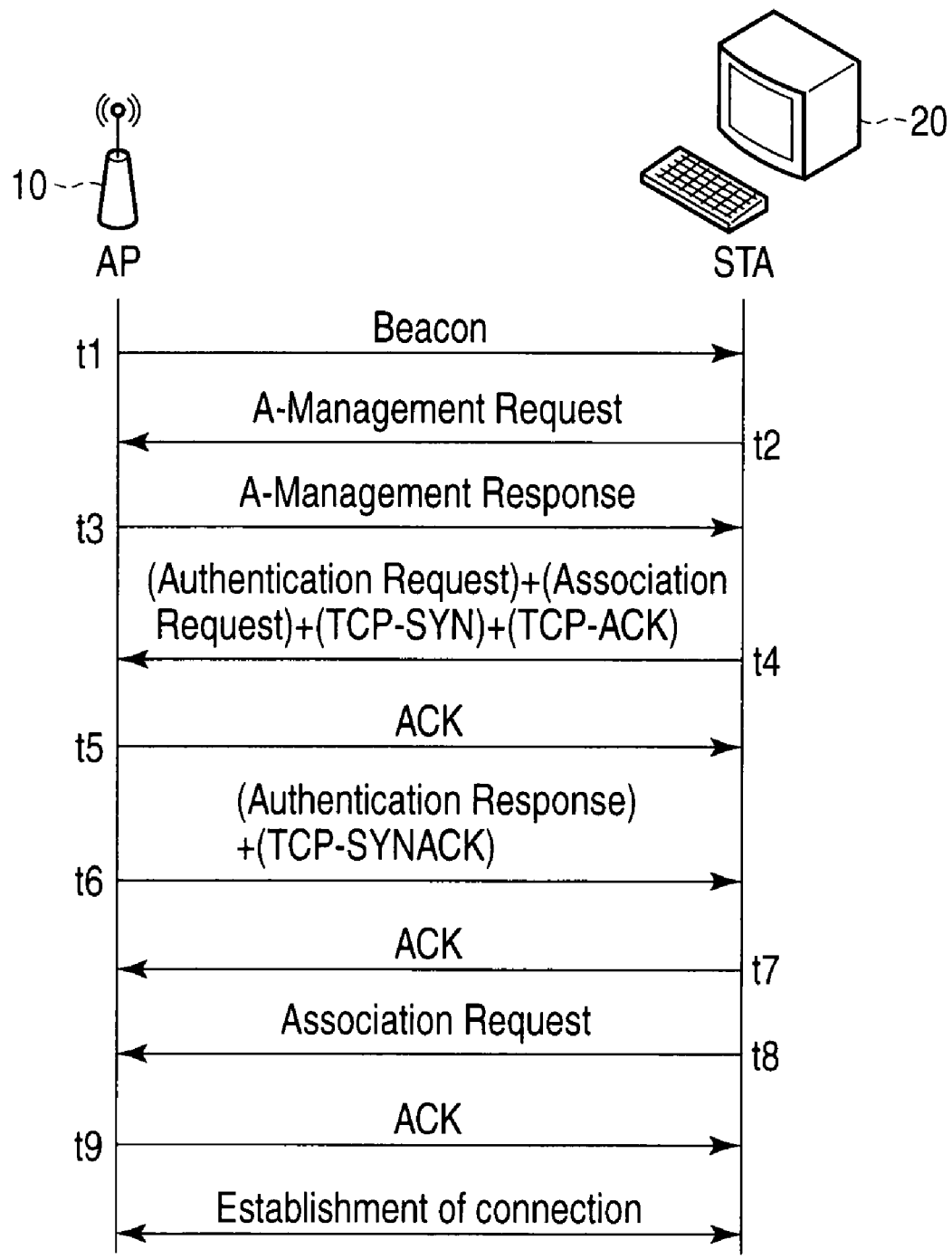
F I G. 1 1

WIRELESS COMMUNICATION APPARATUS CAPABLE OF PERFORMING AGGREGATED TRANSMISSION

CROSS-REFERENCE TO RELATED APPLICATIONS

This application is based upon and claims the benefit of priority from prior Japanese Patent Application No. 2008-126078, filed May 13, 2008, the entire contents of which are incorporated herein by reference.

BACKGROUND OF THE INVENTION

1. Field of the Invention

The present invention relates to a wireless communication apparatus used for a wireless LAN system. In particular, the present invention relates to a protocol sequence for establishing a communication connection.

2. Description of the Related Art

In a wireless LAN communication, communication is performed according to a frame format and a communication control protocol sequence determined by the IEEE 802.11 standard. According to a data communication system of a wireless LAN communication, a communication establishment control protocol operates, and thereby, a communicateable environment (i.e., state capable of performing a communication defined in the IEEE 802.11 standard) is established. In this case, a media access control (MAC) layer management frame or upper layer frame is sequentially transmitted one by one, and thereby, a communication connection with a target terminal is established. There is a method of transmitting a frame one by one to establish a communication connection. According to the foregoing method, a receiver returns an acknowledgement (ACK) as an acknowledgement response with respect to each frame transmitted from the target terminal. However, the receiver always returns the acknowledgement as a response every frame, and thereby, a wireless LAN network band is wastefully consumed. In addition, time is taken until a communication connection is established to start the communication.

The foregoing problem is not specially obstructed under a situation that a base station, that is, an access point and a terminal (branch), that is, a station do not move. However, according to a situation that a station moves as telephone service using a wireless LAN, the problem must be considered in the case where there is a possibility of making a connection with different access point very time. Therefore, it is desired to solve the foregoing problem.

Jpn. Pat. Appln. KOKAI Publication No. 2000-341326 discloses the following technique. According to the technique, one transmission message and a return message expected against it are collectively transmitted. In this way, the return message is reduced to improve transmission efficiency.

BRIEF SUMMARY OF THE INVENTION

According to a first aspect of the present invention, there is provided a wireless communication apparatus used as an access point or a wireless terminal in a wireless communication system for performing a wireless communication between the access point and the wireless terminal, comprising:

a control block provided in the wireless communication apparatus used as the access point, and adding an aggregated management information element filed (AMIE field) showing support of aggregated transmission of a MAC layer management frame or upper layer several frames to a frame body of a beacon frame.

According to a second aspect of the present invention, there is provided a wireless communication apparatus used as an access point or a wireless terminal in a wireless communication system for performing a wireless communication between the access point and the wireless terminal, comprising:

a control block provided in the wireless communication apparatus used as either of the access point and the wireless terminal, and aggregating a plurality of management frames in one frame using an aggregated MAC protocol data unit (A-MPDU) defined in the IEEE 802.11n standard of a wireless LAN communication.

According to a third aspect of the present invention, there is provided a wireless communication apparatus used as an access point or a wireless terminal in a wireless communication system for performing a wireless communication between the access point and the wireless terminal, comprising:

a control block provided in the wireless communication apparatus used as either of the access point and the wireless terminal, and aggregating a plurality of management frames in one management frame, and further, storing a specified value in a type field and a subtype field of the management frame to give information that the management frames are aggregated in one management frame.

BRIEF DESCRIPTION OF THE SEVERAL VIEWS OF THE DRAWING

FIG. 5 is a flowchart to explain the operation of an access point in the first embodiment;

FIG. 9 is a view showing an aggregated management frame transmitted from an access point to a station;

FIG. 11 is a view showing a state that a communication is performed in a wireless communication system including a wireless communication apparatus according a fourth embodiment of the present invention.

DETAILED DESCRIPTION OF THE INVENTION

Various embodiments of the present invention will be hereinafter described with reference to the accompanying drawings. In the following description, the same numerals are used to designate common portions over all drawings.

(First Embodiment)

Figure 1:
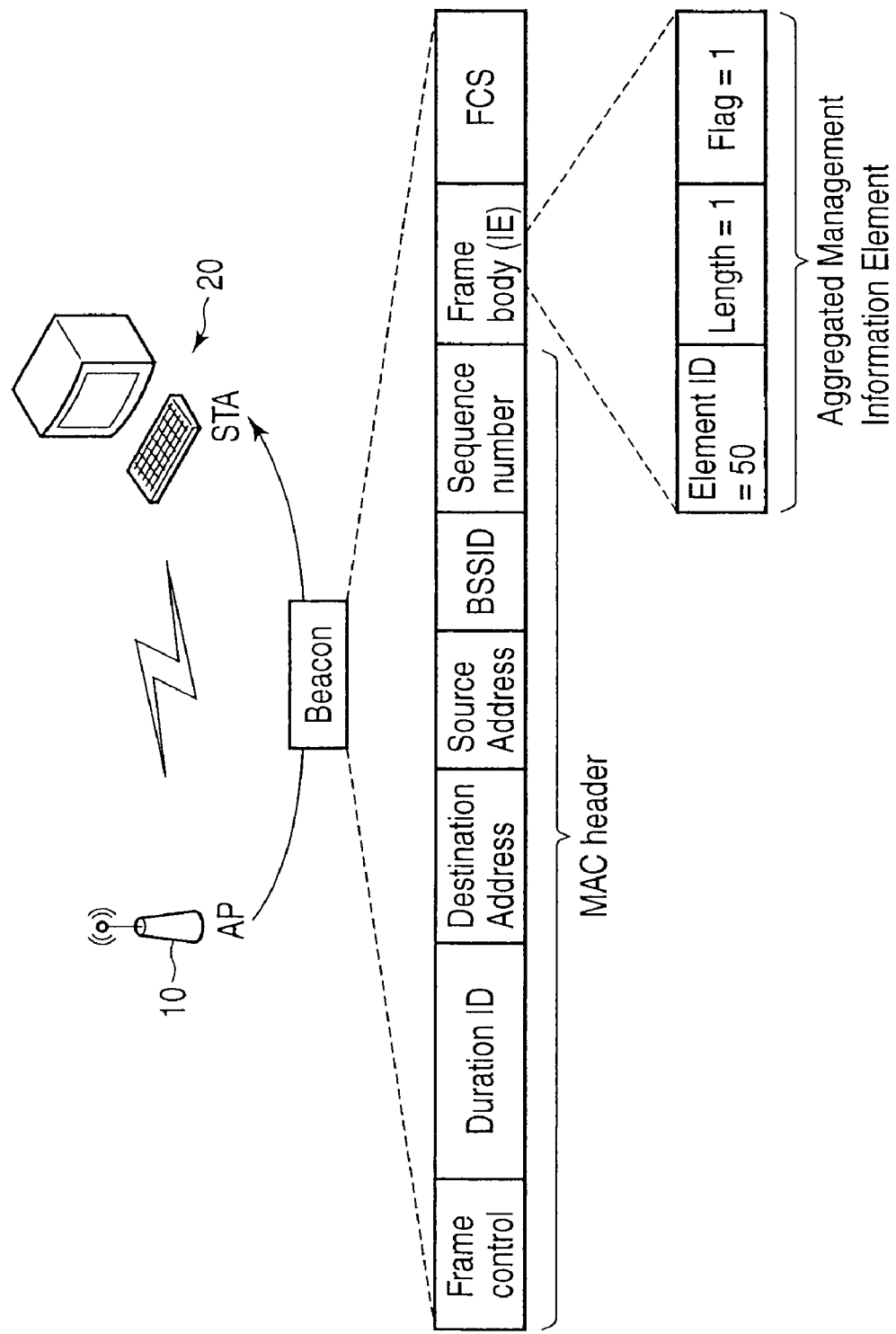
FIG. 1 is a view showing the configuration of a wireless communication system including a wireless communication apparatus according to a first embodiment of the present invention and showing a state that a communication is performed in the wireless communication system.

FIG. 1 shows the configuration of a wireless communication system including a wireless communication apparatus according to a first embodiment of the present invention and shows a state that a communication is performed in the wireless communication system. In FIG. 1, there are shown a state that a beacon frame is transmitted from an access point (AP) 10 to a station (STA) 20, which are each a wireless communication apparatus, and the content of the beacon frame. According to a wireless communication system shown in FIG. 1, a base station, that is, an access point 10 and a terminal (branch), that is, a station 20 exist in one basic service set (BSS). A communication is performed between the access point 10 and the station 20 using a protocol conformed to the IEEE 802.11 standard of a wireless LAN communication.

Figure 2:
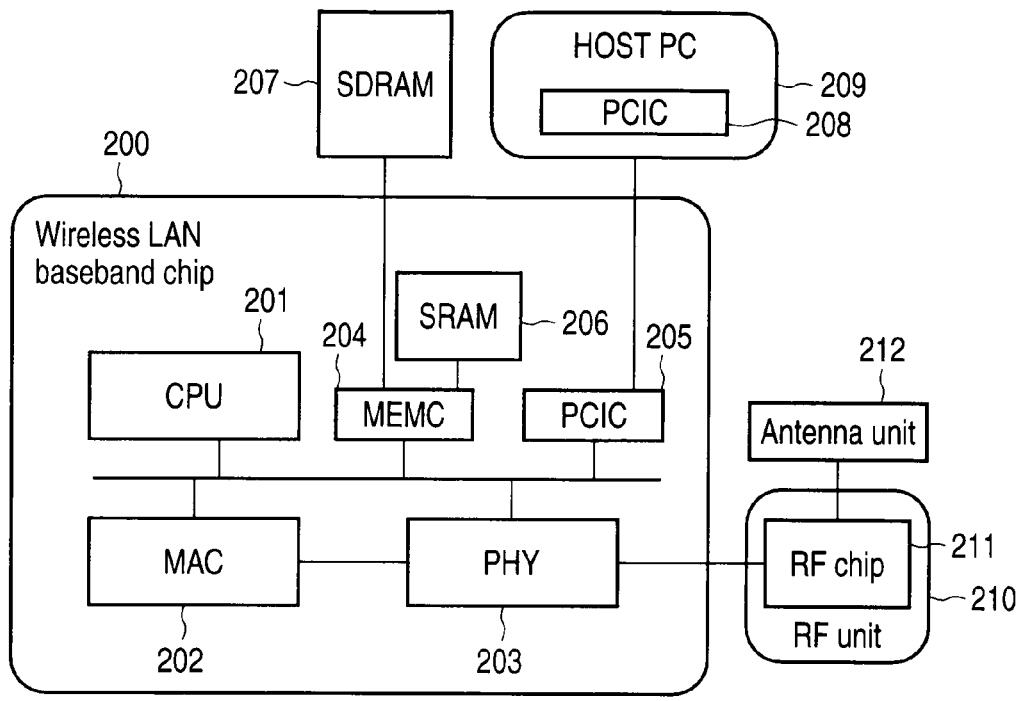
FIG. 2 is a block diagram showing each hardware configuration of an access point and a station shown in FIG. 1.

FIG. 2 is a block diagram showing each hardware configuration of the access point 10 and the station 20 shown in FIG. 1. A wireless communication apparatus corresponds to the access point 10 or station 20 shown in FIG. 1, and performs a communication with another wireless communication apparatus via a wireless channel. The wireless communication apparatus includes a wireless baseband chip 200, a synchronous dynamic random access memory (SDRAM) 207, a host personal computer (HOST PC) 209, a wireless unit (RF unit) 210 and an antenna unit 212. The wireless baseband chip 200 includes a central processing unit (CPU) 201, a MAC layer block (MAC) 202, a physical layer block (PHY) 203, a memory controller (MEMC) 204, peripheral components interconnect controller (PCIC) 205 and a static random access memory (SRAM) 206. The CPU 201 controls the operation of the whole of the chip. The MAC layer block 202 is a processor in a MAC layer. The physical layer block (PHY) 203 is a processor for handling a physical layer to realize a wireless communication. The physical layer block 203 handles a physical layer protocol to realize a loaded communication processing. The physical layer block 203 includes a transmission unit and a reception unit. The transmission unit transmits a frame transferred from the MAC layer block 202 to a wireless channel. The reception unit handles a wireless signal received from the antenna. The transmission unit includes a modulator and a digital-to-analog converter. The modulator executes a transmission processing including modulation and coding. The digital-to-analog converter converts a digital signal from the modulator to an analog signal. The reception unit includes a low noise amplifier, a down converter, an analog-to-digital converter and a demodulator. Specifically, the low noise amplifier amplifies a reception signal from the antenna. The down converter converts a frequency of the amplified signal to an intermediate frequency or baseband frequency. The analog-to-digital converter converts a frequency-converted analog signal to a digital signal. The demodulator executes a reception processing including demodulation and decoding with respect to the digital signal according to a physical layer protocol. Further, the reception unit transfers a MAC frame to the MAC layer block 202. These MAC layer block 202 and physical layer block 203 may be realized as an analog circuit or digital circuit. Moreover, these blocks 202 and 203 may be realized by software executed by the CPU.

An RF unit 210 is connected to the physical layer block 203 of the wireless baseband chip 200 and the antenna unit 212. The RF unit 210 has an RF chip 211. The RF chip 211 up-converts an analog baseband signal converted by the physical layer block to a predetermined frequency band (e.g., 2.4 GHz or 5 GHz), and transmits the signal from the antenna 212 as a wireless signal. The antenna unit 212 has one or two antennas or more in accordance with a loaded communication method.

The basic operation of the access point and the station will be described below. Data transmitted from the HOST PC 209 is stored in memories (SRAM 206 and SDRAM 207) via the PCIC 208 of the HOST side and the PCIC 205 of the wireless LAN baseband chip 200. An access to SRAM 206 and SDRAM 207 is made via the MEMC 204. Data stored in the memory is handled by the CPU 201, and thereafter, output to the RF unit 210 via the MAC layer block 202 and the physical layer block 203. Then, the data is sent from the RF chip 211 to the antenna unit 212, and finally, transmitted as a wireless LAN frame. Data reception is performed according to the flow reverse to data transmission.

The procedure described in this embodiment and various embodiments described later may be performed by either of software or hardware. If the procedure is performed by hardware, the procedure is performed by the MAC layer block 202. If the procedure is performed by software, the procedure is performed by the CPU 201.

According to this embodiment, as shown in FIG. 1, the access point 10 adds an aggregated management information element (AMIE) field to a frame body of a beacon frame when transmitting a beacon frame. The aggregated management information element (AMIE) shows that an aggregated management frame is receivable. Information element (IE) forming a frame body includes other various IEs. In order to show that AMIE is included in the frame body, the frame body (IE) includes an element ID field, a flag field and a length field. The element ID field is identification data showing AMIE. The flag field shows a support of aggregated transmission of several frames. The length field shows a data length of the flag field at the unit of byte. According to this embodiment, for example, "50" is stored as the element ID, "1" is stored as the length field, and "1" is stored as a flag field.

The access point 10 holds a plurality of protocol combinations shown in the following table 1 so that no influence is given to the following frame even if several frames are simultaneously transmitted on protocol before starting a communication.

TABLE 1

(Authentication Response) + (Association Response)
(Authentication Response) + (Association Response) +
(4-way Handshake Message 1)
(Authentication Response) + (Association Response) + (TCP-SYNACK)

In the foregoing table 1, the uppermost line means a combination of two protocols (Authentication Response) and (Association Response). The intermediate line means a combination of three protocols (Authentication Response), (Association Response) and (4-way Handshake Message 1). The lowermost line means a combination of three protocols (Authentication Response), (Association Response) and (TCP-SYNACK).

Likewise, the station 20 holds a plurality of protocol combinations shown in the following table 2 so that no influence is given to the following frame even if several frames are simultaneously transmitted on protocol before starting a communication.

TABLE 2

(Authentication Request) + (Association Request)
(Authentication Request) + (Association Request) + (TCP-SYN) + (TCP-ACK)
(Authentication Request) + (Association Request) + (TCP-SYN) + (TCP-ACK) + (HTTP-GET)

In the foregoing Table 2, the uppermost line means a combination of two protocols (Authentication Request) and (Association Request). The intermediate line means a combination of four protocols (Authentication Request), (Association Request), (TCP-SYN) and (TCP-ACK). The lowermost line means a combination of five protocols (Authentication Request), (Association Request), (TCP-SYN), (TCP-ACK) and (HTTP-GET).

Figure 3:
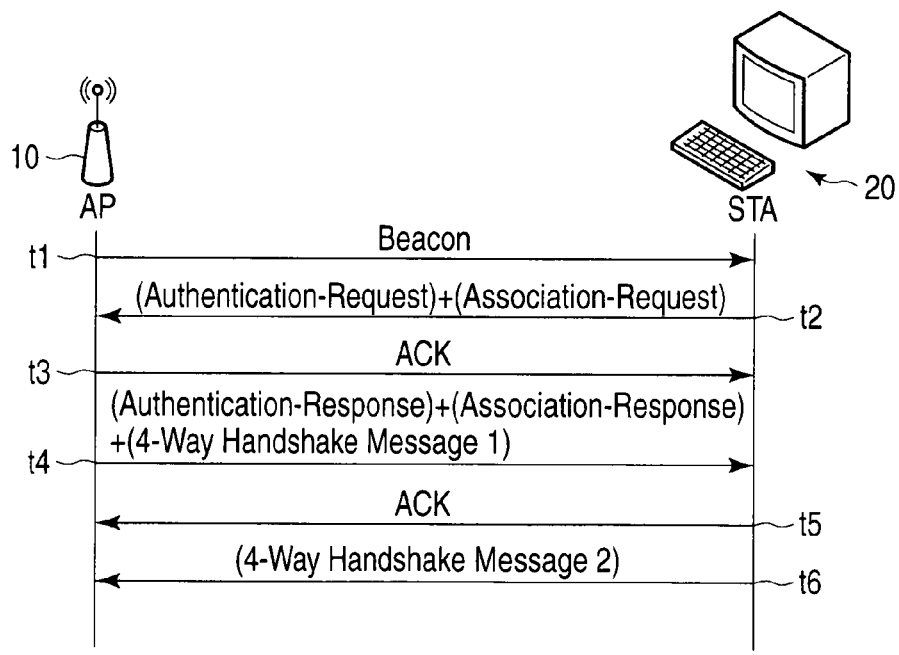
FIG. 3 is a timing chart to explain the procedure of aggregating and transmitting frames having no problem even if a plurality of frames are aggregative transmitted using a MAC layer when a communication connection is established between the access point and the station in the first embodiment.

Data showing the contents of the table 1 and 2 are properly produced in accordance with the kind of protocol supported by the self terminal. In this case, a frame giving no influence to the following frame includes the following protocols. One is a protocol used for a MAC layer only as shown in FIG. 3. The other is a protocol used for an upper layer in addition to the MAC layer as shown in FIG. 4.

FIG. 3 is a timing chart to explain the procedure of aggregating and transmitting frames having no problem even if a plurality of frames are simultaneously transmitted using a MAC layer when a communication connection is established between the access point 10 and the station 20 in the first embodiment. At time t1, a beacon frame is transmitted from the access point 10 to the station 20. In this case, the access point 10 transmits the beacon frame adding an AMIE field to a frame body of the beacon frame in order to show that the self supports aggregated transmission of several frames. At time t2, the station 20 simultaneously transmits Authentication request and Association Request to the access point 10. Then, the station 20 checks the beacon frame transmitted from the access point 10 to detect whether the AMIE field is included. Including the AMIE field means that the access point 10 supports aggregated transmission of several frames. Therefore, the station 20 simultaneously transmits Authentication request and Association Request using one frame although they have been transmitted one by one in the conventional case. When the access point 10 correctly receives an aggregated frame transmitted from the station 20, at time t3, the access point 10 transmits acknowledgement (ACK) to the station 20. At time t4, the access point 10 simultaneously transmits Authentication Response, Association Response and 4-way Handshake Message 1 to the station 20 using one frame. When the station 20 correctly receives the aggregated frame transmitted from the access point 10, at time t5, the station 20 transmits acknowledgement (ACK) to the access point 10. At time t6, the station 20 singly transmits a 4-way Handshake Message 2 to the access point 10. The reason why the foregoing single transmission is made is because a protocol capable of performing aggregated transmission with the 4-way Handshake Message 2 does not exist in the prepared Table 2.

Figure 4:
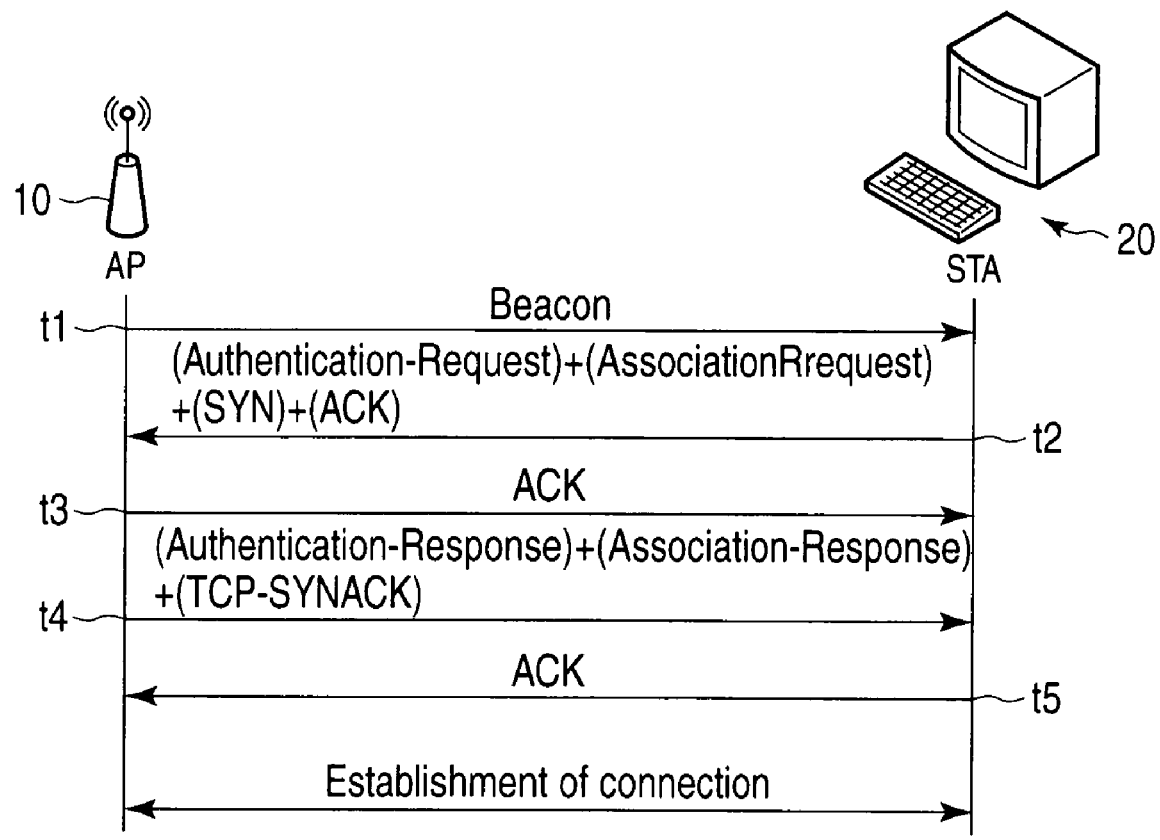
FIG. 4 is a timing chart to explain the procedure of aggregating and transmitting frames having no problem even if aggregated transmission is carried out using both MAC layer protocol and upper layer protocol when a communication connection is established between the access point and the station in the first embodiment.

FIG. 4 is a timing chart to explain the procedure of aggregating and transmitting frames having no problem even if aggregated transmission is carried out using both MAC layer protocol and upper layer (TCP/IP) protocol when a communication connection is established between the access point 10 and the station 20 in the first embodiment. At time t1, a beacon frame is transmitted from the access point 10 to the station 20. In this case, the access point 10 transmits the beacon frame adding an AMIE field to a frame body of the beacon frame in order to show that the self supports aggregated transmission of several frames. The station 20 checks the beacon frame transmitted the access point 10 to detect whether the AMIE field is included. Including the AMIE field means that the access point 10 supports aggregated transmission/reception of several frames. The access point 10 supports aggregated transmission/reception of several frames, and thereby, at time t2, the station 20 simultaneously transmits Authentication request, Association Request, TCP-SYN and TCP-ACK, which have been singly transmitted in the conventional case, using one frame. When the access point 10 correctly receives the aggregated frame transmitted from the station 20, at time t3, the access point 10 transmits acknowledgement (ACK) to the station 20. At time t4, the access point 10 simultaneously transmits Authentication Response, Association Response and TCP-SYNACK using one frame. When the station 20 correctly receives the aggregated frame transmitted from the access point 10, at time t5, the station transmits acknowledgement (ACK) to the access point 10. The access point 10 receives the acknowledgement (ACK), and thereafter, a MAC connection and a TCP connection are established between the access point 10 and the station 20.

As described in FIGS. 3 and 4, the access point 10 transmits the beacon frame to which AMIE (aggregated management information element) is added, and thereby, notifies the following matter of the station 20. Namely, the access point 10 has a support additional function, that is, supports transmission/reception of an aggregated management frame. In response to the notification, the station 20 executes aggregated transmission in an aggregated state without transmitting a management frame one by one. Access point 10 and station 20 aggregates the management frame, and then transmits it one time regardless of layer so long as an influence is not given to the following frame even if aggregated transmission is executed on protocol.

The foregoing configuration is provided, and thereby, an environment capable of performing aggregated transmission of several frames is produced. Therefore, access point 10 and station 20 can know whether the self can perform aggregated transmission using what protocol or combination. For example, from the intermediate line of the table 2, the station 20 knows that the self can transmit four messages, Authentication Request and Association Request conformed to the IEEE 802.11 of MAC layer, TCP-SYN and TCP-ACK conformed to the protocol of a network layer.

FIG. 5 is a flowchart to explain the operation by an access point in the first embodiment and a second embodiment described later.

First, the access point prepares a listing table (data) shown in the table 1, for example (step 301). The access point adds an AMIE field to a frame body of a beacon frame (step 302). Then, the access point transmits the beacon frame (step 303). The access point waits for transmission of a message from the station, and determines whether or not an aggregated management request (AMR) message is received (step 304). If the message is received (Yes), the station determines that aggregated transmission is supported using A-MPDU, and then, the operation proceeds to step 305. In step 305, the access point itself determines whether the self supports aggregated transmission using A-MPDU. If the aggregated transmission is supported (Yes), the operation proceeds to step 306. Conversely, if the aggregated transmission is not supported, the operation proceeds to step 311. In step 306, the access point gives information that the access point supports aggregated transmission using A-MPDU using A-Management Response. In step 307, the access point waits for transmission of a management frame according to an A-MPDU format from the station. When the management frame is transmitted, the access point determines whether or not a return message exists based on the table prepared in step 301 (step 308). If the return message exists (Yes), the access point determines the return message from the table prepared in step 301 (step 309), and executes aggregated transmission according to the A-MPDU format, and then, returns to step 307. Conversely, if the return message does not exist in step 308 (No), the procedure ends.

Conversely, the message transmitted from the station in step 304 is not an AMR message (No), the access point determines whether or not "00" is stored in a type field of the frame controller of the received frame while "0111" is stored in a subtype field (step 312). If it is determined that data is stored (Yes), the access point determines whether or not a return message exists based on the table prepared in step 301 (step 313). If the return message does not exist in step 313 (No), the procedure ends. Conversely, if the return message exists (Yes), the operation proceeds to step 314. In step 314, the access point selects the return message from the table prepared in step 301, and then, transmits the aggregated frame in step 315. Thereafter, the operation returns to step 312.

In step 312, if a desired value is not stored in the type field and the subtype filed, the access point determines that a frame having no relation is transmitted and executes usual control (step 316), and then, ends the operation.

Figure 6:
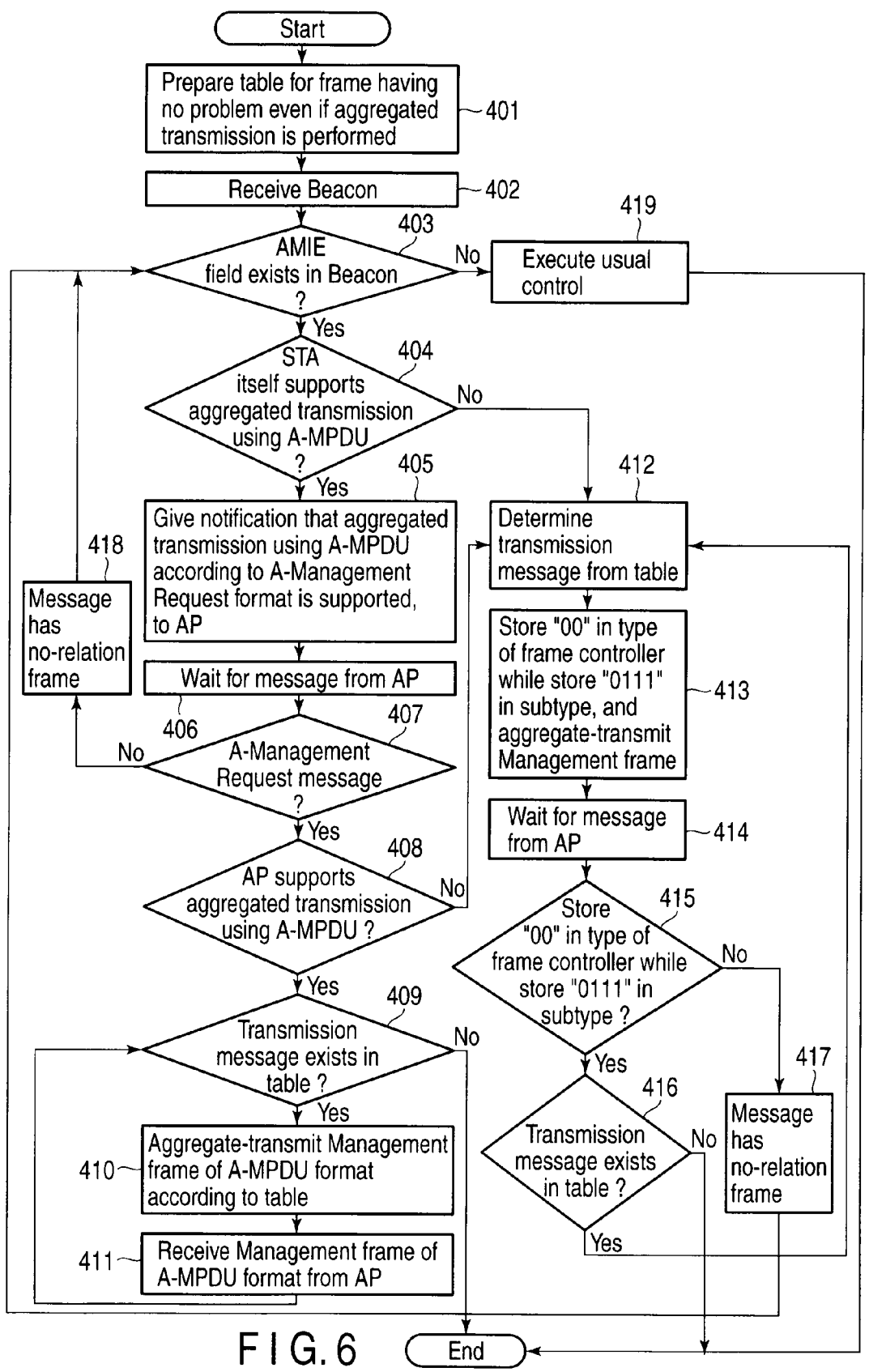
FIG. 6 is a flowchart to explain the operation of a station in the first embodiment.

FIG. 6 is a flowchart to explain the operation by a station in the first embodiment and a second embodiment described later. For example, the station prepares a listing table (data) shown in the table 2 (step 401). Then, the station receives a transmitted beacon frame (step 402), and determines whether or not an AMIE field exists in the transmitted frame (step 403). If it is determined that the AMIE field exists (Yes), the operation proceeds to step 404. Conversely, if the AMIE field does not exist (No), the usual operation is carried out because of having no relation (step 419). In step 404, the station determines whether or not the self supports aggregated transmission using an A-MPDU. If the station supports the aggregated transmission (Yes), the operation proceeds to step 405; conversely, if the station does not support the aggregated transmission (No), the operation proceeds to step 412. In step 405, the station gives information the self supports aggregated transmission using the A-MPDU via A-Management Request. In steps 406 and 407, the station waits for transmission of A-Management Response from the access point as a response to the A-Management Request. If the A-Management Response is not transmitted (No), the operation proceeds to step 418, and thereafter, the station determines that the received frame is a frame having has no-relation, and proceeds to step 403. Conversely, if the A-Management Response is transmitted (Yes), the operation proceeds to step 408. In step 408, the station determines whether or not the access point supports aggregated transmission using A-MPDU. If the access point supports the aggregated transmission (Yes), the operation proceeds to step 409. Conversely, the access point does not support the aggregated transmission (No), the operation proceeds to step 412. In step 409, the station checks whether or not the transmitted message exists based on the table prepared in step 401. If the transmitted message exists (Yes), the operation proceeds to step 410; conversely, if the message does not exist, the procedure ends. In step 410, the station transmits an aggregated management frame of A-MPDU format according to the table, and then, receives a management frame of A-MPDU format from the access point (step 411). Thereafter, the operation returns to step 409.

Conversely, in step 404 if the station does not support aggregated transmission using A-MPDU (No), or in step 408, if the access point itself does not support aggregated transmission using A-MPDU (No), the operation proceeds to step 412. In step 412, the station determines a message to be transmitted using the table prepared in step 401. When the message to be transmitted is determined, the operation proceeds to step 413, the station stores "00" in a type field of the frame controller included in a MAC header of the transmission frame and stores "0111" in a subtype field. Thereafter, the station transmits an aggregated management frame. After frame transmission, the station waits for a message returned from the access point (step 414). When the station receives a return message from the access point, the station checks whether or not "00" is stored in a type field of the frame controller included in a MAC header of the transmission frame and "0111" is stored in the subtype field (step 415). If it is confirmed that the data are stored (Yes), the operation proceeds to step 416. Conversely, if the data is not confirmed, the operation proceeds to step 417, the station receives a frame having no relation, and then returns to step 403. In step 416, if a message to be transmitted exists based on the table prepared instep 401 (Yes), the operation returns to step 412; conversely, if the message does not exist (No), the procedure ends.

According to the foregoing first embodiment, the AMIE field is added to the frame body of the beacon frame. Therefore, the access point gives information that an aggregated management frame is supported, to the station, which tries to make a connection with the access point. Aggregated several protocol are transmitted, and thereby, it is possible to shorten wait time until a communication starts. In addition, it is possible to shorten wait time until a communication starts when protocols (e.g., TCP/IP) used for an upper network layer is aggregated and transmitted.

(Second Embodiment)

Figure 7:
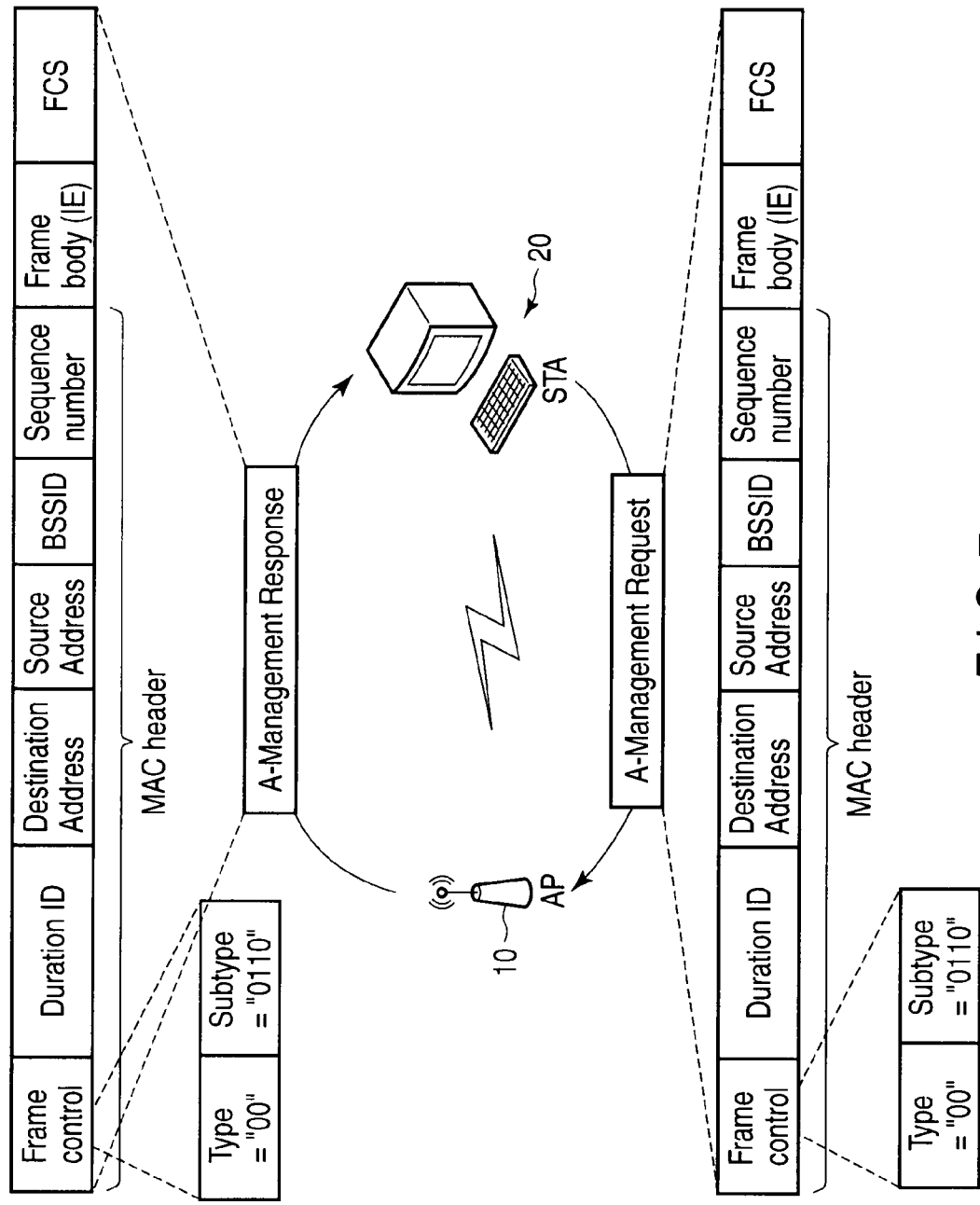
FIG. 7 is a view showing the configuration of a wireless communication system including a wireless communication apparatus according to a second embodiment of the present invention and showing a state that a communication is performed in the wireless communication system.

FIG. 7 is a view showing the configuration of a wireless communication system including a wireless communication apparatus according to a second embodiment of the present invention and showing a state that a communication is performed in the wireless communication system. According to the wireless communication system shown in FIG. 7, a base station, that is, an access point 10 and a terminal, that is, a station 20 exist in one basic service set. Both access point 10 and station 20 support the IEEE 802.11n standard of a wireless LAN communication. Each hardware configuration of access point 10 and station 20 is as shown in the block diagram of FIG. 2. FIG. 7 shows the following state and the content of an A-management request and an A-management response. Specifically, a beacon frame is transmitted from the access point 10 to the station 20, and thereafter, an aggregate management request (A-management Request) message is transmitted from the station 20 to the access point 10. Thereafter, an aggregated management response (A-Management Response) message is transmitted from the access point 10 to the station 20.

Figure 8:
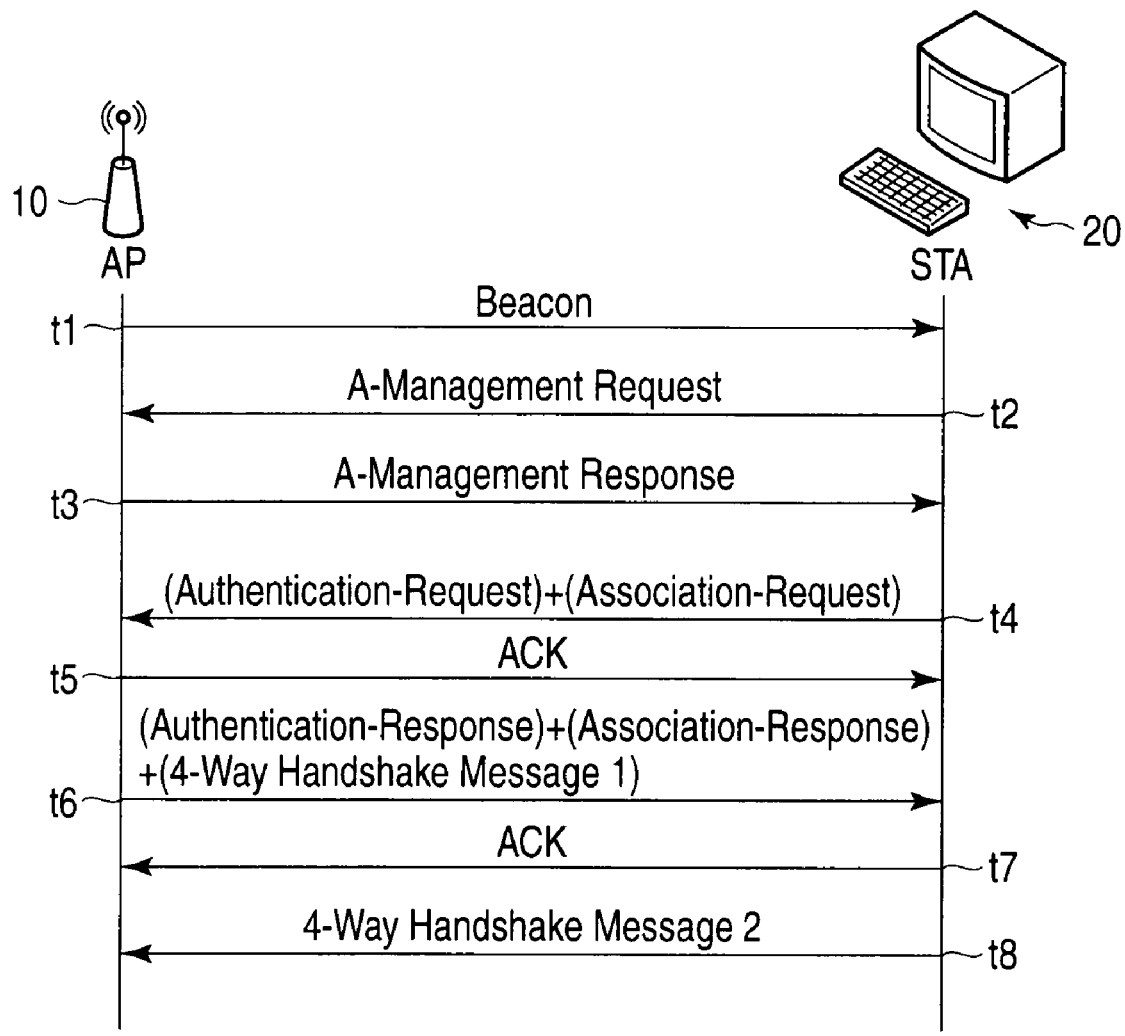
FIG. 8 is a timing chart to explain the procedure of aggregating and transmitting a plurality of frames when a communication connection is established between the access point and the station in the second embodiment.

FIG. 8 is a timing chart to explain the procedure of aggregating and simultaneously transmitting several frames when a communication connection is established between the access point 10 and the station 20 in the second embodiment.

At time t1, a beacon frame is transmitted from the access point 10 to the station 20. At time t2, the station 20 transmits an A-Management Request to the access point 10. At time t3, the access point 10 transmits an A-Management Response to the station 20. A frame stored "00" in the type field of the frame controller and stored "0110" in the subtype field is received and transmitted. This serves to know the following information. Namely, access point 10 and station 20 can know that communication partners support an aggregated management frame. The combination such that data is stored in the type field and the subtype field is not defined in the IEEE 802.11n of a wireless LAN communication, and this is newly provided according to this embodiment. Thereafter, at time t4, the station 20 simultaneously transmits an Authentication Request and an Association Request to the access point 10 using one frame. The station 20 knows that the access point 10 supports aggregated transmission of several frames via the A-Management Response received at time t3. Therefore, two frames, that is, Authentication Request and Association Request, which have been singly transmitted in the conventional case, are simultaneously transmitted using one frame. When the access point 10 correctly receives the aggregated frame transmitted from the station 20, at time t5, the access point 10 transmits acknowledgement (ACK) to the station 20. At time t6, the access point 10 simultaneously transmits an Authentication Response, an Association Response and a 4-way Handshake Message 1 to the station 20 using one frame. When the station 20 correctly receives the aggregated frame transmitted from the access point 10, at time t7, the station 20 transmits acknowledgement (ACK) to the access point 10. At time t8, the station 20 singly transmits a 4-way Handshake Message 2 to the access point 10. The reason why the 4-way Handshake Message 2 is singly transmitted is because a protocol capable of performing aggregated transmission with the 4-way Handshake Message 2 does not exist.

FIG. 9 shows the configuration of an aggregated management frame transmitted from access point 10 to station 20 at time t6 in FIG. 8. An Authentication Response frame, an Association Response frame and a 4-way Handshake Message 1 frame are linked via a Delimiter Signature.

In FIG. 7, the access point 10 can know that the station 20 supports aggregated transmission of a management frame using A-MPDU via the A-management Request frame transmitted the station 20. The station 20 can know that the access point 10 supports aggregated transmission of a management frame using A-MPDU via the A-management Response frame transmitted the access point 10. According to the foregoing A-management Request and A-management Response, "00" is stored in the type field of the frame controller of the MAC header and "0110" is stored in the subtype field. In the A-management Request, "1" is stored in one-byte frame body. In the A-management Response, "0" is stored in one-byte frame body. Therefore, the frame is determined that it is A-management Request or A-management Response from three information, that is, a value stored in the frame body, the type filed and the subtype filed.

According to the second embodiment, station 20 and access point 10 supporting the IEEE 802.11n standard can mutually know that an A-MPDU format defined by the IEEE 802.11n standard is used for aggregated transmission of the management frame. The foregoing message is exchanged, and thereafter, the management frame aggregated according to the A-MPDU format is transmitted and received as shown in FIG. 8.

(Third Embodiment)

Figure 10:
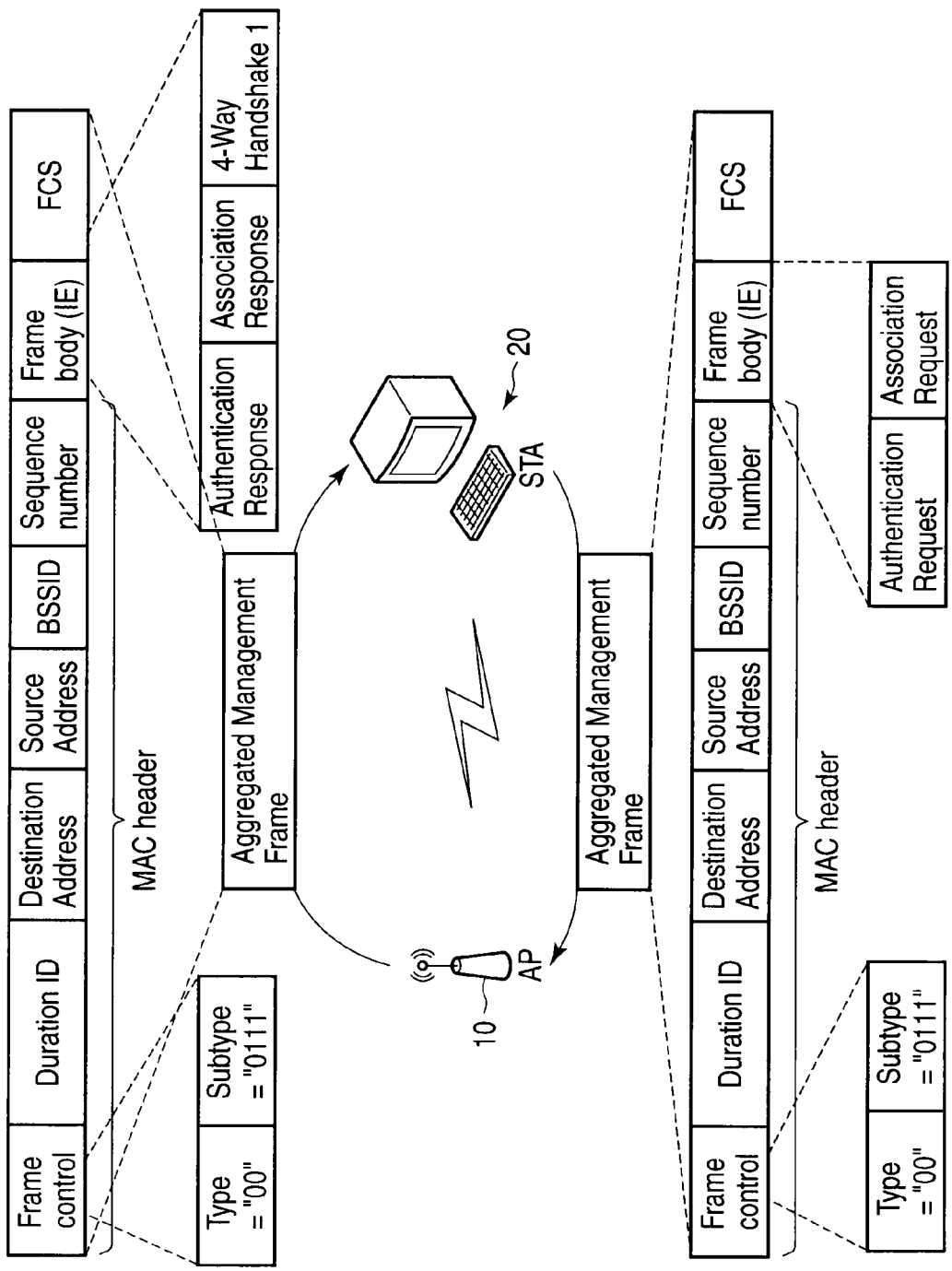
FIG. 10 is a view showing the configuration of a wireless communication system including a wireless communication apparatus according to a third embodiment of the present invention and showing a state that a communication is performed in the wireless communication system.

FIG. 10 is a view showing the configuration of a wireless communication system including a wireless communication apparatus according to a third embodiment of the present invention and showing a state that a communication is performed in the wireless communication system. According to the wireless communication system shown in FIG. 10, a base station, that is, an access point 10 and a terminal, that is, a station 20 exist in one basic service set. Neither access point 10 nor station 20 supports the IEEE 802.11n standard of a wireless LAN communication. Each hardware configuration of access point 10 and station 20 is as shown in the block diagram of FIG. 2. FIG. 10 shows the following state and the content of an aggregated management frame. Specifically, a beacon frame is transmitted from the access point 10 to the station 20, and thereafter, an aggregated management frame aggregating several management frames in one management frame is transmitted from the station 20 to the access point 10. Thereafter, an aggregated management frame aggregating several management frames in one management frame is transmitted from the access point 10 to the station 20.

According to this embodiment, the beacon frame is transmitted from the access point 10 to the station 20. Thereafter, the station 20 transmits an aggregated management frame aggregating several frames to the access point 10. Then, the access point 10 transmits an aggregated management frame aggregating several frames to the station 20. The station 20 and the access point 10 store the aggregated frame in a frame body of the transmitted aggregated management frame. In FIG. 10, the station 20 aggregates two frames, that is, Authentication Request and Association Request. The access point 10 aggregates three frames, that is, Authentication Response, Association Response and 4-way Handshake 1. The station 20 and the access point 10 store "00" in a type field of the frame controller of a MAC header while store "0111" in a subfield in order to show that they aggregate several frames. In this way, the station 20 and the access point 10 can mutually detect that the management frame aggregating several frames is included.

According to the third embodiment, even if a station, does not support the IEEE 802.11n standard, exists, data of several management frames are aggregated to a management frame conformed to the IEEE 802.11n standard, and thereby, aggregated transmission is performed.

(Fourth Embodiment)

FIG. 11 shows a state that a communication is performed in a wireless communication system including a wireless communication apparatus according to a fourth embodiment. According to the fourth embodiment, a communication is performed between an access point 10 and a station 20 using a protocol sequence used for the wireless communication system of the second embodiment. A plurality of management frames are aggregated in an A-MPDU frame transmitted from the station 20.

As shown in FIG. 11, at time t1, a beacon frame is transmitted from the access point 10 to the station 20. Thereafter, at time t2, an A-Management Response is transmitted from the station 20 to the access point 10. In this way, information that aggregation of the management frame using A-MPDU is supported is given. At time t3, A-Management Response is transmitted from the access point 10 to the station 20. In this way, information that aggregation of the management frame using A-MPDU is supported is given. At time t4, the A-MPDU frame is transmitted from the station 10. The A-MPDU frame aggregates four frames, that is, Authentication Request, Association Request, TCP-SYN and TCP-ACK. For example, the Association Request frame data lacks, and then, does not reach the access point 10. In this case, the access point 10 received the A-MPDU frame from the station 20 can detect what frame lacks. Therefore, the access point 10 does not store a frame having a problem that data lacks. Then, the access point 10 transmits acknowledgment (ACK) to the station at time t5, and returns the A-MPDU frame excluding an Association Response frame as a return against Association Request frame, which has not been received, to the station 20 at time t6. The station 20 received the A-MPDU frame returned from the access point 10 can know that data intended by the station 20 is not transmitted from the content of the frame returned at time t6. Therefore, the station 20 checks what portion of the A-MPDU frame transmitted by the self should be retransmitted. At time t5, the station transmits acknowledgement (ACK), and then, retransmits the Association Request frame only at time t8. At time t9, the access point 10 transmits acknowledgment (ACK). The station 20 receives the acknowledgment (ACK), and thereafter, a connection is established between the access point 10 and the station 20.

According to the fourth embodiment, aggregated transmission of management frames is performed, and thereby, it is possible to know what frame lacks. Therefore, the portion only to be retransmitted can be provided to the partner. According to this embodiment, it is possible to perform acknowledgement and retransmission of the transmitted frame.

(Fifth Embodiment)

A fifth embodiment will be described below. The fifth embodiment differs from the fourth embodiment in the following point. Specifically, there is provided a wireless communication system for performing a communication between an access point 10 and a station 20, which do not support the IEEE 802.11n of a wireless LAN communication. According to the fifth embodiment, a communication is performed between access point and station using the protocol sequence in the wireless communication system of the foregoing third embodiment.

Figure 12:
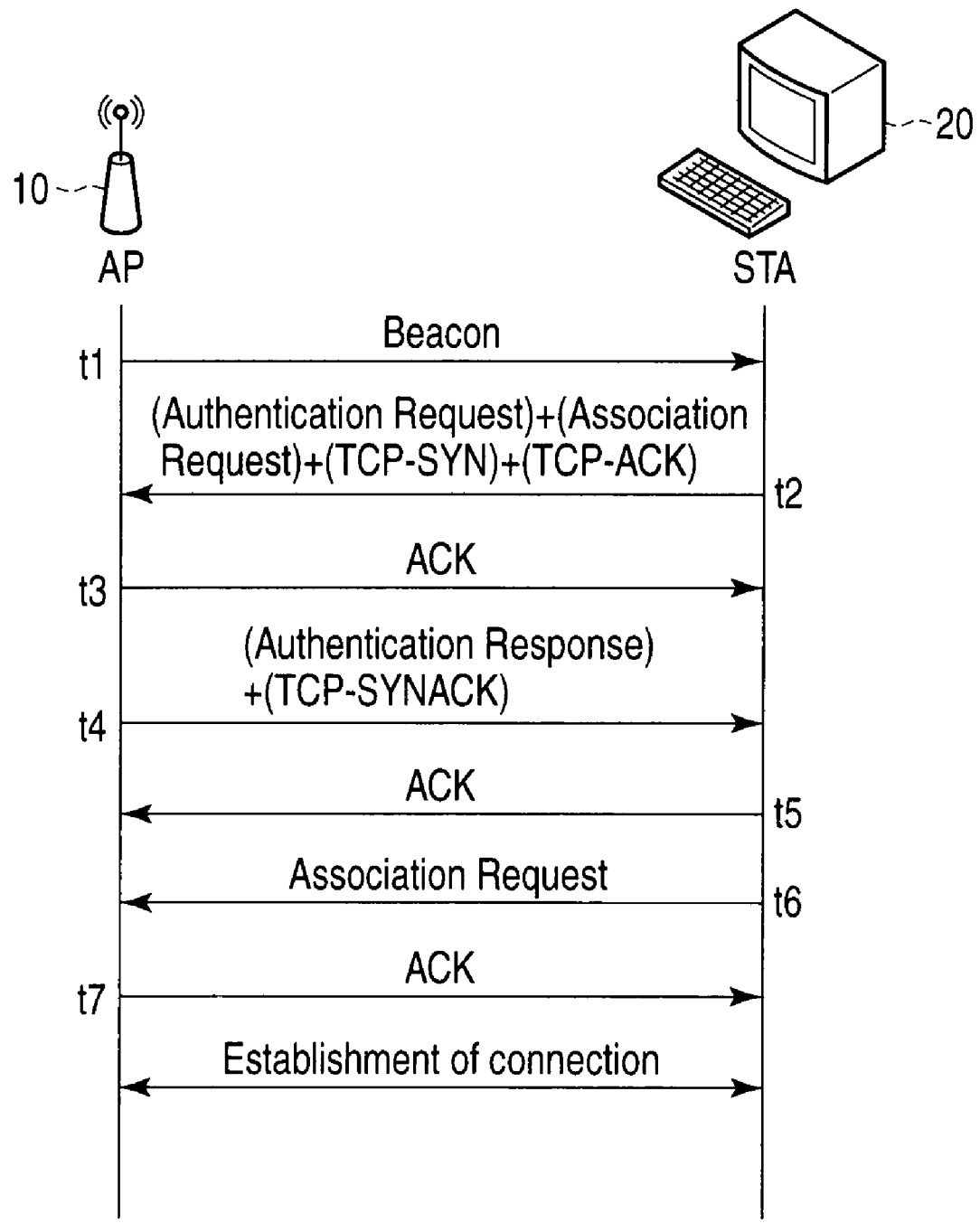
FIG. 12 is a view showing a state that a communication is performed in a wireless communication system including a wireless communication apparatus according a fifth embodiment of the present invention.

As shown in FIG. 12, data transmitted by the station 20 aggregates a plurality of management frames. The access point 10 received the aggregated management frame from the station 20 can know what frame lacks. Therefore, the access point 10 does not store a frame having a problem that data lacks, and then, returns the management frame excluding the problem portion. In this embodiment, an Association Request frame is not included; therefore, the access point 10 returns the Association Response frame as a return against Association Request, which has not been received, without storing it. The station 20 received the management frame returned from the access point 10 can know that data intended by the self is not transmitted via the returned frame. Therefore, the station 20 checks what portion of the management frame transmitted by the self should be retransmitted, and thus, can retransmit data only related to the Association Request.

According to the fifth embodiment, the management frame is aggregated, and then, aggregated transmission is performed. If a frame is destroyed during transmission, a portion only to be retransmitted can be provided to the partner. According to this embodiment, it is possible to perform acknowledgement and retransmission of the transmitted frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a control block provided in the wireless communication apparatus used as the access point, and adding an aggregated management information element field (AMIE field) showing support of aggregated transmission of a MAC layer management frame and upper layer plural frames to a frame body of a beacon frame.

2. The apparatus according to claim 1, wherein the AMIE field includes identify data showing AMIE, a flag showing a support of aggregated transmission of frames, and data showing a data length of the flag.

3. The apparatus according to claim 1, wherein the wireless communication apparatus holds a plurality of combinations of several control protocols giving no influence to the following frame on a communication establishment control protocol even if aggregated transmission of frames is performed.

4. The apparatus according to claim 1, wherein the control block is a MAC layer block.

5. The wireless communication apparatus according to claim 1, wherein
the control block aggregates a plurality of management frames in one frame using an aggregated MAC protocol data unit (A-MPDU) defined in the IEEE 802.11n standard of a wireless LAN communication.

6. The apparatus according to claim 5, wherein the control block is a MAC layer block.

7. The apparatus according to claim 5, wherein the aggregated frame includes a MAC header, and the MAC header includes a frame control field, and further, the frame control field includes a type field and a subtype field, and the control block stores data showing a support of aggregated transmission of the management frames in the type field and the subtype field.

8. The apparatus according to claim 7, wherein the control block stores "00" in the type field, and stores "0110" in the subtype field.

9. The apparatus according to claim 5, wherein the wireless communication apparatus determines that portion lacks from the content of the A-MPDU returned from a partner if a part of the A-MPDU used by either of the access point and the wireless terminal lacks, and retransmits the lacked portion.

10. The apparatus according to claim 5, wherein the wireless communication apparatus holds a plurality of combinations of several control protocols giving no influence to the following frame on a communication establishment control protocol even if aggregated transmission of frames is performed.

11. The wireless communication apparatus according to claim 1, wherein
the control block aggregates a plurality of management frames in one management frame, and further, stores a specified value in a type field and a subtype field of the management frame to give information that the management frames are aggregated in one management frame.

12. The apparatus according to claim 11, wherein the wireless communication apparatus does not support the IEEE 802.11n standard of a wireless LAN communication, and the control block stores "00" in the type field, and stores "0111" in the subtype field.

13. The apparatus according to claim 11, wherein the control block is a MAC layer block.

14. The apparatus according to claim 11, wherein the wireless communication apparatus determines that portion lacks from the content of a management frame returned from a partner if a part of the management frame used by either of the access point and the wireless terminal lacks, and retransmits the lacked portion.

15. The apparatus according to claim 11, wherein the wireless communication apparatus holds a plurality of combinations of several control protocols giving no influence to the following frame on a communication establishment control protocol even if aggregated transmission of frames is performed.

* * * * *